Patented Aug. 7, 1945

2,380,970

UNITED STATES PATENT OFFICE 2,380,970

STABLE PACKAGED PHARMACEUTICAL PREPARATION AND METHOD OF PREPARING THE SAME

Vladimir Kitter, New York, N. Y.

No Drawing. Application April 9, 1940,
Serial No. 328,693

6 Claims. (Cl. 226—19)

This invention relates to a stable packaged pharmaceutical preparation containing in solid form chloramine T and a metallic iodide, these components being reactable when the preparation is dissolved in water. The preparation may be of the type in which these components react to produce nascent iodine in aqueous solution for use as an antiseptic and germicidal agent or may contain additional substances reactive with this iodine. In one specific form of the invention the stable pharmaceutical preparation contains chloramine T and a metallic iodide and in addition a water soluble organic substance oxidizable by iodine, said components being mutually reactable when the preparation is dissolved in water with the concomitant generation of ultraviolet radiation and with the production of a solution of marked germicidal and antiseptic properties.

The first step in the formation of my preparation is to heat the chloramine T to the extent necessary to remove substantially all of the water of crystallization. This step may be carried out at a temperature not exceeding 100° C. but is preferably carried out in vacuum at a lower temperature and to the extent necessary to remove substantially all of the water of crystallization. The metallic iodide is then dried or desiccated to the extent necessary to remove substantially all of the mechanically bound water. The iodide used should be water soluble and for practical purposes potassium iodide is preferred. Where the object is to make a preparation yielding nascent iodine, the chloramine T and iodide are preferably mixed in substantially reacting proportions. Where the object is to make the special preparation yielding a solution having antiseptic and germicidal properties with concomitant generation of ultra-violet radiation, I form a preparation containing chloramine T, water soluble metallic iodide, preferably potassium iodide, and a sugar. In this case the chloramine T is treated as described to remove substantially all of the water of crystallization, and preferably the metallic iodide is dried to remove substantially all of the mechanically bound water; the sugar is also dried to remove any water that is mechanically bound or in solution. Since the sugar must be dried at a temperature below the point of caramelization, this operation is carried out in vacuum at a suitable temperature. The sugar that I prefer for this purpose is dextrose, and in this case the drying must be carried out at a temperature of not over 140° F. to prevent caramelization. I further find it of specific advantage to use sodium benzoate as a part of the water soluble oxidizable organic substance. This, in combination with the other steps herein described, enhances the stability and efficiency of the resulting pharmaceutical preparation.

A specific example of the preferred preparation made in accordance with my invention is as follows:

|  | Percent |
|---|---|
| Dehydrated chloramine T | 23.3335 |
| Desiccated potassium iodide | 15.0005 |
| Desiccated dextrose | 22.7775 |
| Desiccated benzoate | 38.8885 |

Some latitude is in any case permissible in the removal of water from the components of the preparation but the treatment should in any case be such that the total amount of water, including therein any remainder of water of crystallization in the chloramine T, is not in excess of 2% by weight of the chloramine T present and for maximum stability the water should not be in excess of 1%. With the special formula containing sodium benzoate, additional materials may be present in the preparation, such as flavoring or sweetening ingredients and effervescence producing materials. The total amount of material present in such a unit charge of the preparation is 10 grains, of which the ingredients hereinabove enumerated constitute 33.843%. The total amount of moisture present in all of the materials must not exceed the limits specified.

When the materials have been treated in the manner hereinabove described, they are mixed to form the desired preparation. This mixing should be conducted in a special atmosphere that is artificially conditioned so that the amount of moisture present does not exceed 3 grains per cubic foot. Preferably the amount of moisture present does not exceed 1½ grains. When the preparation has been so formed, it must be sealed in an air-tight wrapper, that is, it must be hermetically sealed against any further contact with the atmosphere. Preferably the special atmosphere is maintained up to the point of complete sealing. For this sealing I have found desirable a rendable wrapper of aluminum foil .002" in thickness. Preferably the preparation is first compressed into tablets. Each tablet is then placed between two pieces of aluminum foil carrying at their inter-face a special resinous sealing substance, and the two pieces of foil are then sealed together by the application of heat and pressure to produce an envelope that is both air-tight and easily rendable. Where the preparation is in tablet form, the pieces of aluminum foil are preformed so that when laid together they form a receptacle into which the tablet fits exactly. The preparation so made is characterized by permanent stability.

The expression "air-tight" as employed in the claims connotes complete impermeability to air, and, of course, complete impermeability to molecules of water which are a constituent of the air. Examples of air-tight materials are aluminum foil entirely free from perforations, and glass.

The foregoing description is by way of illustration and not of limitation, and it is, therefore, my intention that the invention be limited only by the appended claims or their equivalents, in which I have endeavored to claim broadly all inherent novelty.

I claim:

1. In the method of making a stable pharmaceutical preparation containing chloramine T and a metallic iodide the steps comprising removing substantially all the water of crystallization from solid chloramine T, drying a solid metallic iodide to the extent necessary to remove substantially all of the mechanically bound water, thereafter mixing said dehydrated chloramine T with the said dried metallic iodide, said mixing being conducted in an atmosphere containing not exceeding three grains of moisture per cubic foot, the amount of water present in the admixed materials, including water of crystallization, aggregating not in excess of 2% by weight of said chloramine T and sealing the admixed materials in an air tight wrapper.

2. Method according to claim 1 in which the amount of water present in the admixed materials does not aggregate in excess of 1% by weight of said chloramine T.

3. Method according to claim 1 in which said mixing is conducted in an atmosphere containing not exceeding one and one-half grains of moisture per cubic foot.

4. A stable pharmaceutical preparation comprising dehydrated solid chloramine T and a solid metallic iodide, the amount of water present in said preparation, including water of crystallization, aggregating not in excess of 2% by weight of said chloramine T, said preparation being sealed in an air tight wrapper.

5. A stable pharmaceutical preparation comprising dehydrated solid chloramine T, a solid metallic iodide and water soluble organic material oxidizable by iodine, the amount of water present in said preparation aggregating, including water of crystallization, not in excess of 2% by weight of said chloramine T, said preparation being sealed in an air tight wrapper.

6. A stable pharmaceutical preparation comprising dehydrated solid chloramine T, a solid metallic iodide, a sugar and sodium benzoate, the amount of moisture present in said preparation, including water of crystallization, aggregating not in excess of 2% by weight of said chloramine T, said preparation being sealed in an air tight wrapper.

VLADIMIR KITTER.